Nov. 19, 1929.  E. I. HIATT  1,736,197
LEVER OPERATING ATTACHMENT FOR DRAWN IMPLEMENTS
Filed Dec. 2, 1927
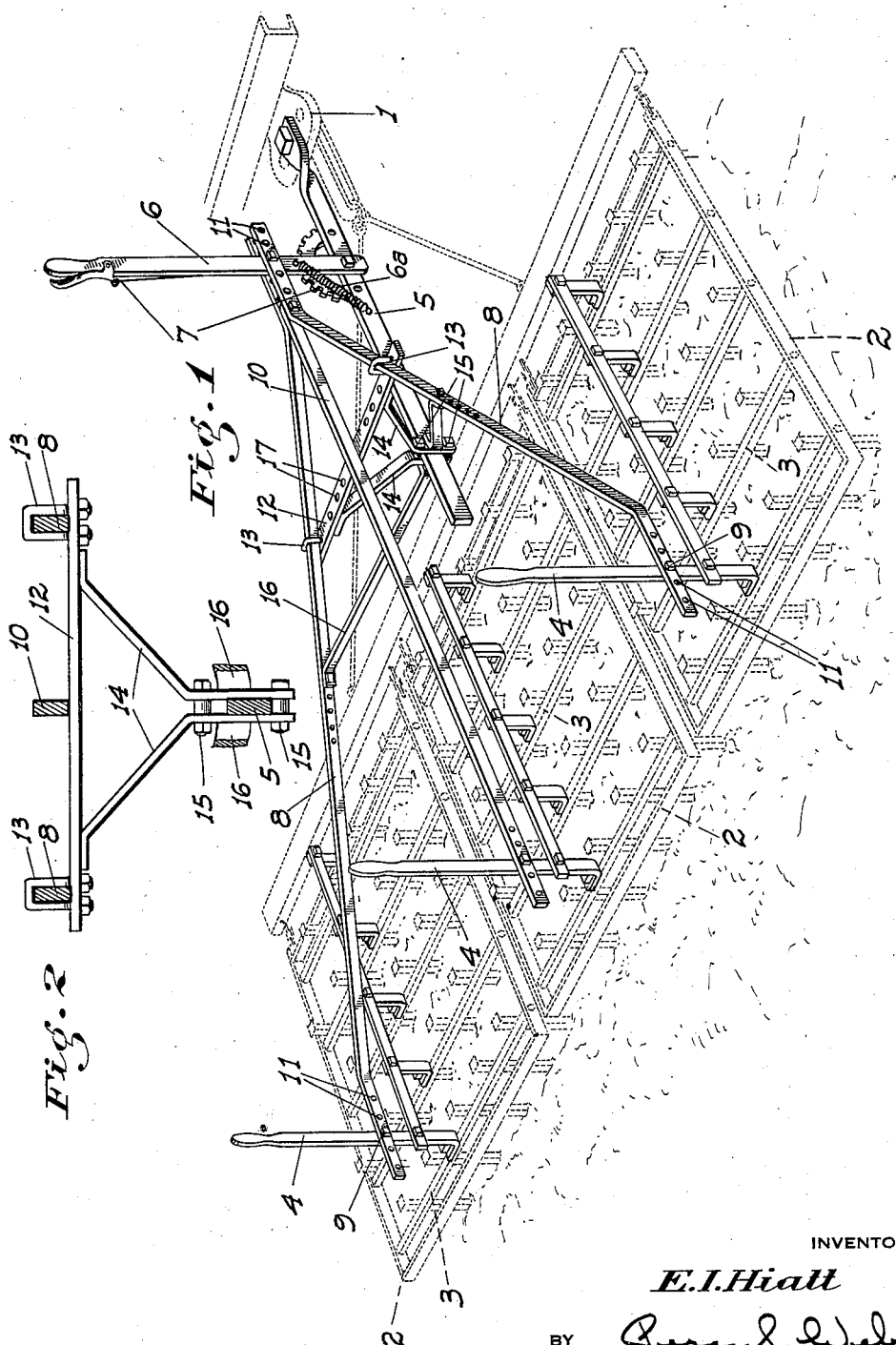
INVENTOR
*E. I. Hiatt*
BY
ATTORNEY Patented Nov. 19, 1929

1,736,197

UNITED STATES PATENT OFFICE

EDWARD I. HIATT, OF MODESTO, CALIFORNIA

LEVER-OPERATING ATTACHMENT FOR DRAWN IMPLEMENTS

Application filed December 2, 1927. Serial No. 237,176.

This invention relates to devices for manipulating the depth control and similar levers of plows, cultivators, harrows, and any other implements arranged to be drawn by a tractor or similar draft means, and provided with levers which require manipulation at one time or another while operations are being carried on.

The principal object of my invention is to provide a device, adapted to be detachably applied to a tractor and to the levers of the implement, and so arranged that the driver of the tractor can manipulate all the levers of the implements simultaneously without stopping the movement of the implement and without having to dismount from the factor.

At present it is necessary to stop the movement of the implement while each lever is manipulated separately to adjust the members controlled thereby as may be necessary during operations. With my appliance, on the other hand, operations as a whole are considerably speeded up as will be evident, and the lever manipulation is considerably facilitated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective elevation of my lever control attachment as in operation and shown in connection with a 3-unit gang harrow.

Fig. 2 is a fragmentary cross section of the attachment.

Referring to the numerals of reference on the drawings, 1 denotes the usual drawhead of the tractor which as shown here is connected by suitable and customary means to three transversely alined harrow frames 2, the vertical position of whose teeth supporting bars 3 is controlled by separate upstanding levers 4. These levers are usually associated with pawl and ratchet holding mechanisms, which I have not shown since in applying my attachment I remove such mechanisms or render the same ineffective.

My improved lever operating attachment, to control all the levers simultaneously from the tractor, comprises a longitudinal bar 5 pivotally connected to the drawhead 1 and extending rearwardly therefrom. Pivoted on this bar intermediate its ends is an upstanding lever 6 having pawl and ratchet holding mechanism indicated generally at 7 associated therewith. Pivotally connected to this lever are substantially horizontal links 8 which at their forward ends straddle the lever and which diverge thence rearwardly to extend to the outermost levers 4, to which levers said links are pivotally connected as at 9. The central lever 4 is connected to a straight link 10 which extends forwardly to a pivotal connection with the links 8 just rearwardly of the lever 6. It will therefore be seen that if the lever 6 is turned one way or the other, all the levers 4 will be simultaneously moved so that all said levers are controlled from the single lever 6. All the links are provided with longitudinally extending series of holes 11 near their ends, so that they may be connected at different points in their length to the corresponding levers as may be required for adjustment purposes with different implements.

Projecting transversely under the links 8 ahead of the rear end of the bar 5 is a cross bar 12, to which said links are clamped by U bolts 13 or the like. Straps 14 project downwardly from the cross bar in converging relation to the bar 5 and then extend downwardly along side said bar as shown. Bolts 15 through said straps above and below the bar 5 connect the straps together and form a guide and supporting structure for the bar 5 through which the latter is relatively slidable. Diagonally and rearwardly extending brace straps 16 extend from the lower ends of the straps 14 to connections with the links 8 at adjustable points in the length of the latter.

It will therefore be seen that the bar 5 is supported against sagging by the bar 12 and the guide structure depending therefrom, without interfering with the longitudinal movement of the links had when the lever 6 is swung one way or the other. The bolts 15 are spaced a sufficient distance apart so that said bar 5 can have the necessary vertical play as the links, and consequently the bar support and guide, move up or down relative to said bar with the movement of the lever in either direction past a vertical position. This arrangement also permits of the inevitable vertical play between the implement and the tractor being had without interference, since the various links are pivoted both to the lever 6 and to the implement levers 4. If the implement only has two levers, the central link 10 is removed and the links 8 are drawn in closer to engage the two remaining levers. In this case the U bolts 13 are removed from their original positions as shown and are replaced further in along the bar 12, the latter having correspondingly disposed holes as shown at 17 for the reception of said bolts. Likewise the brace straps 16 are connected to the links 8 at different points other than their original points of connection as may be necessary due to the lesser angle of divergence of the links 8 which is then had.

Inasmuch as the bar 5, which supports the control attachment of the whole, is pivoted onto the drawhead in common with the pivotal connection of the drawbar from the implement, it will be seen that as the tractor turns one way or the other the position of the lever attachment relative to the implement is not altered.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A lever operating attachment for use in connection with an implement having transversely spaced upstanding levers, and a draft means connected to the implement; comprising a lever, means supporting said lever from the draft means, and links connected in common to said lever and diverging thence to connections with the implement levers.

2. A lever operating attachment for use in connection with an implement having an upstanding lever, and a tractor connected to the implement; comprising a bar supported from and extending rearwardly of the tractor, a lever pivoted on and upstanding from the bar, and a connection from said lever to the implement lever.

3. A lever operating attachment for use in connection with an implement having transversely spaced upstanding levers, and a tractor connected to the implement; comprising a bar flexibly supported from and extending rearwardly of the tractor, a lever pivoted on and upstanding from the bar intermediate its ends, links connected to said lever and diverging thence to connections with the implement levers, and an auxiliary support and guide structure for the bar secured to and depending from the links rearwardly of the lever.

4. A lever operating attachment for use in connection with an implement having an upstanding lever, and a draft device having a drawhead to which the implement is pivotally connected; including a bar pivoted onto and extending rearwardly of the drawhead, a lever pivoted on and upstanding from the bar, a rigid link connecting said lever with the implement lever, and means for maintaining the bar in longitudinal alinement with the implement regardless of the turning of the draft device.

5. A structure as in claim 4, in which said last named means comprises a rigid structure secured to and depending from the link and through which the bar is slidable.

6. A lever operating attachment for use in connection with an implement having an upstanding lever, and a draft means having a drawhead to which the implement is pivotally connected; including a bar projecting rearwardly from the drawhead and pivoted thereon in common with the implement connection, a lever mounted on the bar, a connection between said lever and the implement lever, and means maintaining said bar in longitudinal alinement with the implement irrespective of the lateral turning of the draft means relative to the implement.

7. A lever operating attachment for use in connection with an implement having an upstanding lever, and a draft means having a drawhead to which the implement is pivotally connected; including a bar projecting rearwardly from the drawhead and pivoted thereon in common with the implement connection, a lever mounted on the bar, a link between said lever and the implement lever, and means between said link and bar to maintain the latter in constant longitudinal alinement with the implement irrespective of the turning of the draft means relative to the implement.

8. A lever operating attachment for use in connection with an implement having an upstanding lever, and a draft means having a drawhead to which the implement is pivotally connected; including a bar projecting rearwardly from the drawhead and pivoted thereon in common with the implement connection, a lever mounted on the bar, a link between said lever and the implement lever, and means between said link and bar to maintain the latter in constant longitudinal alinement with the implement irrespective of the turning of the draft means relative to the implement, while permitting of longitudinal movement of the link relative to the bar.

In testimony whereof I affix my signature.

EDWARD I. HIATT.